US012633161B2

(12) United States Patent
Sun et al.

(10) Patent No.: US 12,633,161 B2
(45) Date of Patent: May 19, 2026

(54) FACIAL IMAGE PROCESSING METHOD AND APPARATUS, AND DEVICE AND MEDIUM

(71) Applicant: Beijing Zitiao Network Technology Co., Ltd., Beijing (CN)

(72) Inventors: Jingna Sun, Beijing (CN); Peibin Chen, Beijing (CN); Yueming Lv, Beijing (CN)

(73) Assignee: BEIJING ZITIAO NETWORK TECHNOLOGY CO., LTD., Beijing (CN)

( * ) Notice: Subject to any disclaimer, the term of this patent is extended or adjusted under 35 U.S.C. 154(b) by 118 days.

(21) Appl. No.: 18/692,767

(22) PCT Filed: Sep. 13, 2022

(86) PCT No.: PCT/CN2022/118356
§ 371 (c)(1),
(2) Date: Mar. 15, 2024

(87) PCT Pub. No.: WO2023/040813
PCT Pub. Date: Mar. 23, 2023

(65) Prior Publication Data
US 2024/0290137 A1 Aug. 29, 2024

(30) Foreign Application Priority Data
Sep. 16, 2021 (CN) .......................... 202111088139.2

(51) Int. Cl.
*G06T 11/60* (2026.01)
*G06V 40/16* (2022.01)
(52) U.S. Cl.
CPC ............ *G06V 40/168* (2022.01); *G06T 11/60* (2013.01)

(58) Field of Classification Search
CPC .. G06T 11/60; G06T 3/00; G06T 3/40; G06V 40/168; G06V 40/171
See application file for complete search history.

(56) References Cited

U.S. PATENT DOCUMENTS 9,799,096 B1 10/2017 De La Torre et al.
2019/0014884 A1 1/2019 Fu et al.
(Continued)

FOREIGN PATENT DOCUMENTS

| CN | 111950432 A | 11/2020 |
| CN | 113298704 A | 8/2021 |
| CN | 113362422 A | 9/2021 |

OTHER PUBLICATIONS

Xiaohan Ma, Fengquan Zhang, Huan Wei, Liuqing Xu, Deep learning method for makeup style transfer: A survey, Cognitive Robotics, vol. 1, 2021, pp. 182-187, ISSN 2667-2413, https://doi.org/10.1016/j.cogr.2021.09.001. (https://www.sciencedirect.com/science/article/pii/S266724132100015X) (Year: 2021).*

(Continued)

*Primary Examiner* — Phi Hoang
(74) *Attorney, Agent, or Firm* — Astute IP Law Group

(57) ABSTRACT

A face image processing method and apparatus, and a device and a medium are provided. The method includes: acquiring a first feature map and a second feature map of a current layer, and generating a plurality of original makeup feature regions corresponding to a plurality of face parts according to the first feature map, generating a plurality of reference makeup feature regions corresponding to the plurality of face parts according to the second feature map, performing makeup migration calculation on each of the original makeup feature regions and a corresponding reference makeup feature region to acquire a plurality of candidate makeup feature regions, stitching the plurality of candidate (Continued)

makeup feature regions to generate a target feature map, and judging whether the target feature map satisfies a preset decoding condition.

20 Claims, 9 Drawing Sheets

(56)                    References Cited

U.S. PATENT DOCUMENTS

| | | | |
|---|---|---|---|
| 2020/0015575 A1* | 1/2020 | Fu | G06T 17/205 |
| 2021/0074054 A1* | 3/2021 | Deng | G06T 17/20 |
| 2021/0295045 A1* | 9/2021 | Li | G06N 3/045 |
| 2021/0312165 A1* | 10/2021 | Zhang | G06V 40/168 |
| 2022/0028139 A1* | 1/2022 | Mitra | G06N 3/0499 |
| 2022/0114767 A1* | 4/2022 | Sela | G06T 11/00 |
| 2022/0398731 A1* | 12/2022 | Tavanei | G06V 40/175 |

OTHER PUBLICATIONS

Tingting Li, Ruihe Qian, Chao Dong, Si Liu, Qiong Yan, Wenwu Zhu, and Liang Lin. 2018. BeautyGAN: Instance-level Facial Makeup Transfer with Deep Generative Adversarial Network. In Proceedings of the 26th ACM international conference on Multimedia 645-653. https://doi.org/10.1145/3240508.3240618 (Year: 2018).*

"<CVPR2020 Oral>AI Makeup Transfer: Pose-Robust Spatial-Aware GAN for Customizable Makeup Transfer", sooner high, Available on internet at: https://blog.csdn.net/g11d111/article/details/107678425, 2020, 9 pages.

Hero, "Makeup Migration Feature: BeautyGAN vs. PSGAN", Knowledge of deep learning, Available on internet at: https://zhuanlan.zhihu.com/p/101271393, 21 pages.

International Search Report and Written Opinion for PCT/CN2022/118356, mailed Dec. 13, 2022, 14 pages.

* cited by examiner

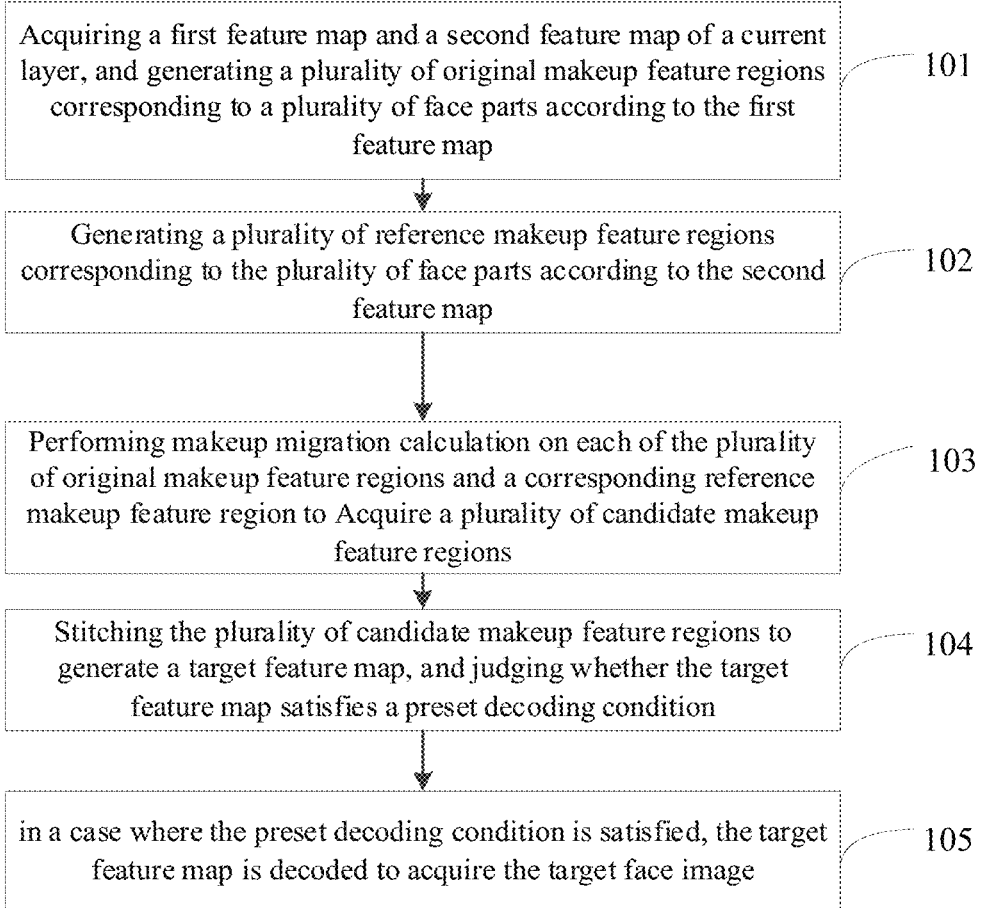

Acquiring a first feature map and a second feature map of a current layer, and generating a plurality of original makeup feature regions corresponding to a plurality of face parts according to the first feature map — 101

Generating a plurality of reference makeup feature regions corresponding to the plurality of face parts according to the second feature map — 102

Performing makeup migration calculation on each of the plurality of original makeup feature regions and a corresponding reference makeup feature region to Acquire a plurality of candidate makeup feature regions — 103

Stitching the plurality of candidate makeup feature regions to generate a target feature map, and judging whether the target feature map satisfies a preset decoding condition — 104 in a case where the preset decoding condition is satisfied, the target feature map is decoded to acquire the target face image — 105

| Makeup Migration Calculation | Third Period |

| Makeup Migration Calculation | Second Period |

| Makeup Migration Calculation | First Period |

FIG.2

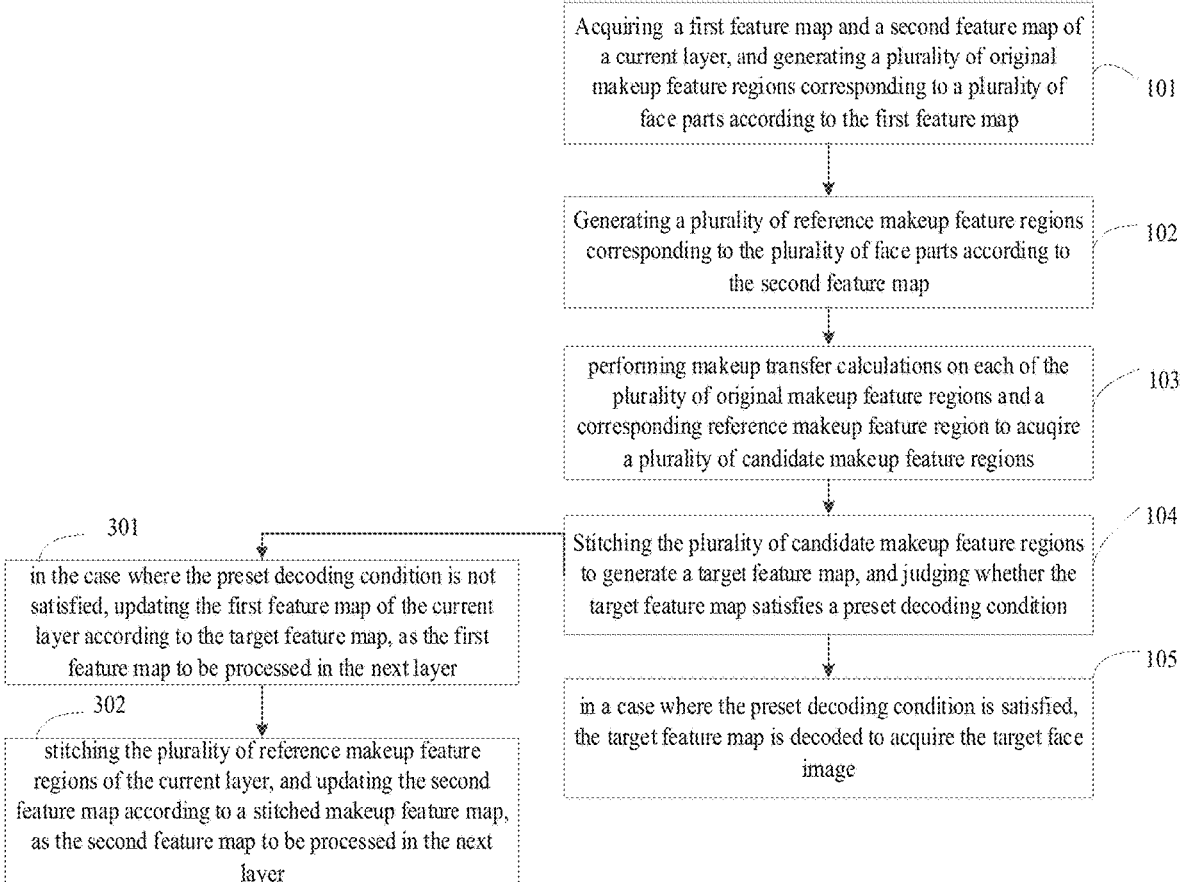

Acquiring a first feature map and a second feature map of a current layer, and generating a plurality of original makeup feature regions corresponding to a plurality of face parts according to the first feature map — 101

Generating a plurality of reference makeup feature regions corresponding to the plurality of face parts according to the second feature map — 102 performing makeup transfer calculations on each of the plurality of original makeup feature regions and a corresponding reference makeup feature region to acuqire a plurality of candidate makeup feature regions — 103

Stitching the plurality of candidate makeup feature regions to generate a target feature map, and judging whether the target feature map satisfies a preset decoding condition — 104

301 in the case where the preset decoding condition is not satisfied, updating the first feature map of the current layer according to the target feature map, as the first feature map to be processed in the next layer

302 stitching the plurality of reference makeup feature regions of the current layer, and updating the second feature map according to a stitched makeup feature map, as the second feature map to be processed in the next layer in a case where the preset decoding condition is satisfied, the target feature map is decoded to acquire the target face image — 105

FIG.3

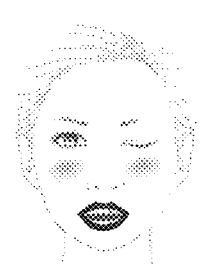
Target Face Image
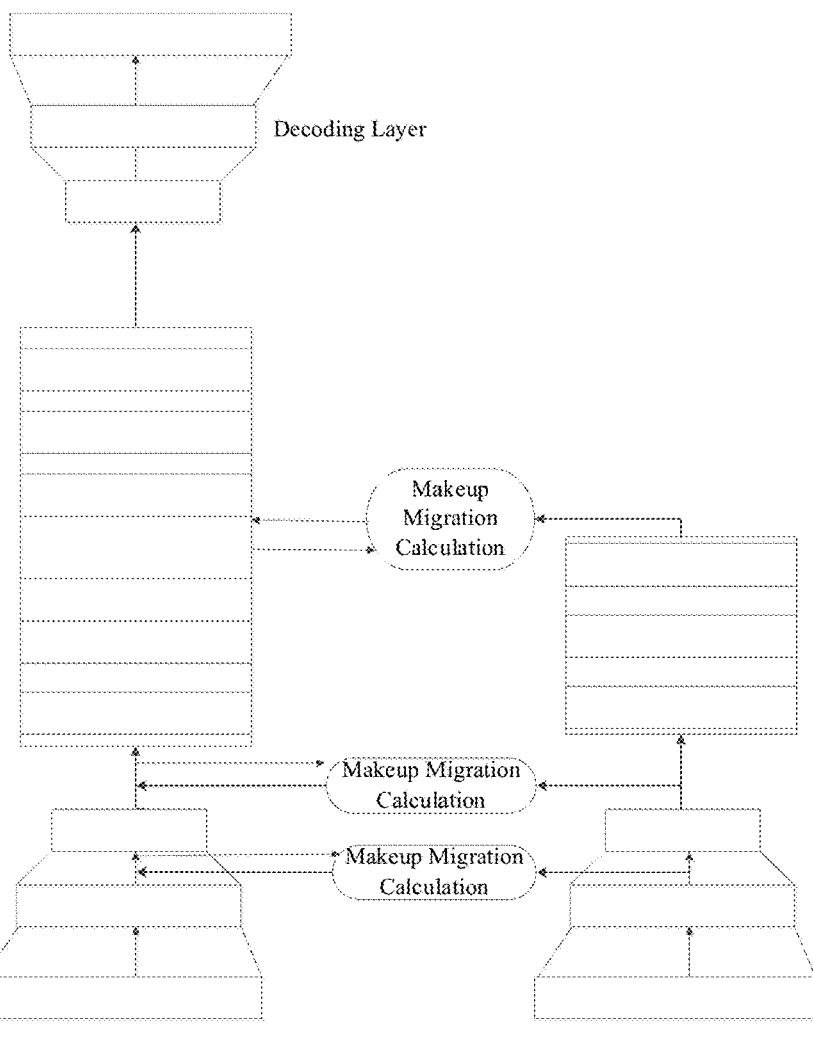
Decoding Layer
Makeup Migration Calculation
Makeup Migration Calculation
Makeup Migration Calculation
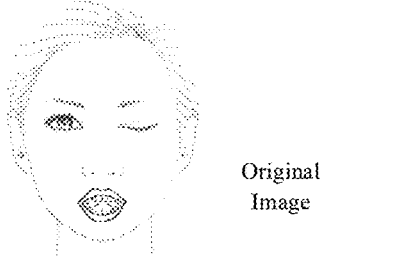
Original Image
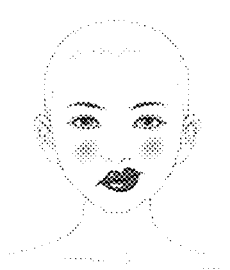
Reference Image
FIG.4

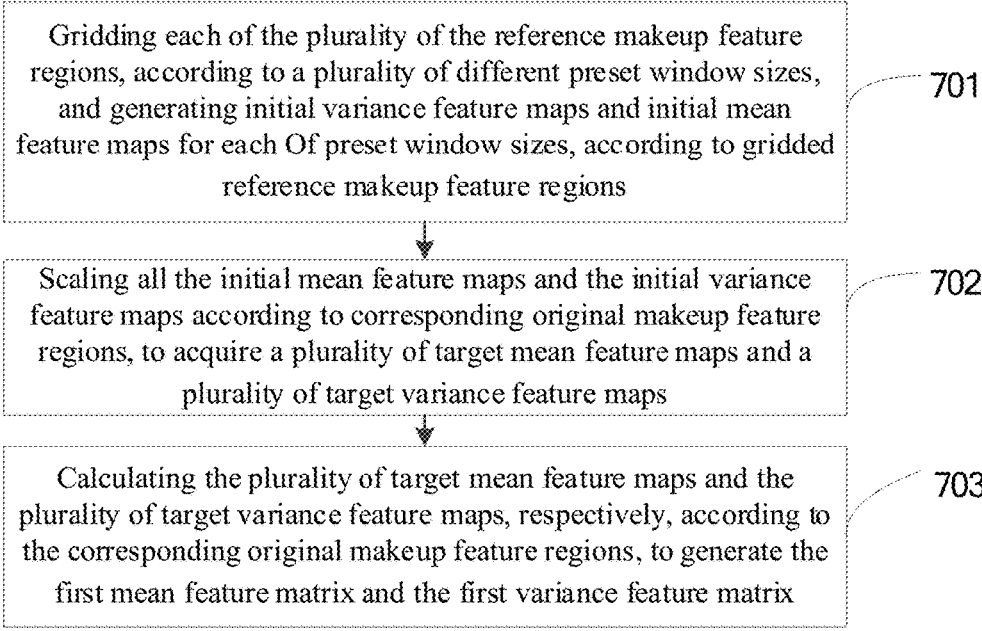

Gridding each of the plurality of the reference makeup feature regions, according to a plurality of different preset window sizes, and generating initial variance feature maps and initial mean feature maps for each Of preset window sizes, according to gridded reference makeup feature regions — 701

Scaling all the initial mean feature maps and the initial variance feature maps according to corresponding original makeup feature regions, to acquire a plurality of target mean feature maps and a plurality of target variance feature maps — 702

Calculating the plurality of target mean feature maps and the plurality of target variance feature maps, respectively, according to the corresponding original makeup feature regions, to generate the first mean feature matrix and the first variance feature matrix — 703

FIG.7

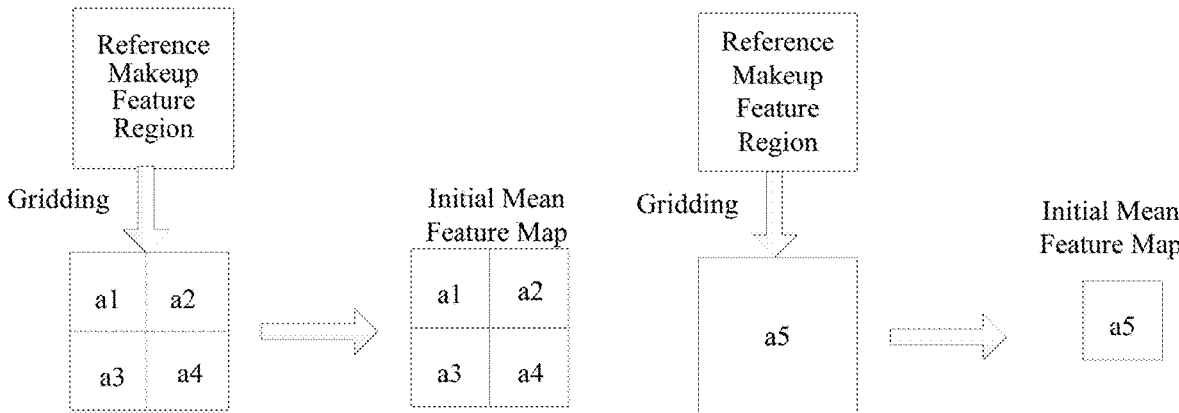

FIG.8

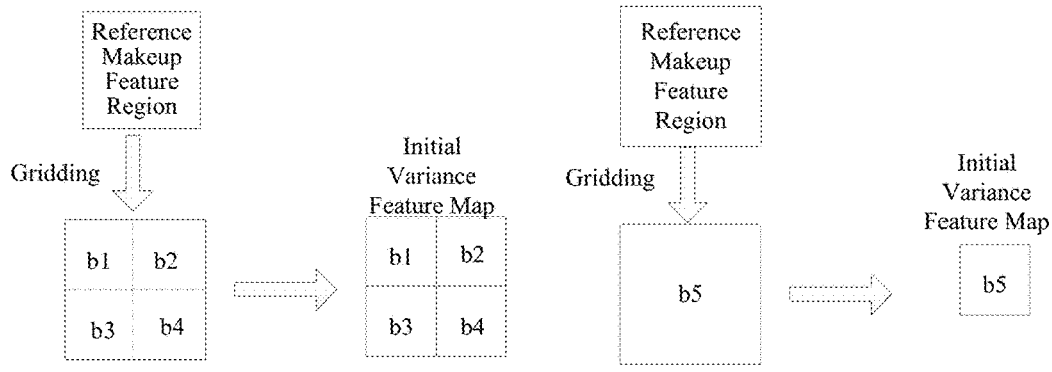

FIG.9

$$F_{ref\_\{R\}}^{i}$$

$$C * h_s * w_s$$

$$F_{src\_\{R\}}^{i}$$

$$\beta_{sapp\_\{R\}}^{i\_1} \qquad \beta_{sapp\_\{R\}}^{i\_2} \qquad \cdots \qquad \beta_{sapp\_\{R\}}^{i\_K}$$

Scaling

GATE $$\beta_{\{R\}}^{i\_1} \qquad \beta_{\{R\}}^{i\_2} \qquad \cdots \qquad \beta_{\{R\}}^{i\_K}$$

$$C * h_s * w_s \qquad C * h_s * w_s \qquad \cdots \qquad C * h_s * w_s$$

$$\alpha_{\{R\}}^{i\_1} \qquad \alpha_{\{R\}}^{i\_2} \qquad \cdots \qquad \alpha_{\{R\}}^{i\_k}$$

$$\beta_{\{R\}}^{i}$$

FIG.10

FACIAL IMAGE PROCESSING METHOD AND APPARATUS, AND DEVICE AND MEDIUM

CROSS-REFERENCE TO RELATED APPLICATION

This is a national stage application based on International Patent Application No. PCT/CN2022/118356, filed Sep. 13, 2022, which claims priority to Chinese patent application No. 202111088139.2, filed on Sep. 16, 2021, and entitled "FACE IMAGE PROCESSING METHOD, APPARATUS, DEVICE, AND MEDIUM", the disclosures of which are incorporated herein by reference in their entireties.

TECHNICAL FIELD

The present disclosure relates to the field of image processing technology, in particular to a face image processing method, apparatus, device, and medium.

BACKGROUND

With the popularization of image processing technology, makeup migration of face images is becoming more common. For example, the makeup of face images with different makeup styles can be migrated, or the makeup of face images with makeup can be migrated to face images without makeup.

In related technologies, based on the simple image segmentation techniques, the makeup image region in the makeup face image is segmented, for example, the eye shadow region, blush region, etc. of the face image with makeup are segmented. Further, the segmented makeup image region is aligned to the original face image to be migrated makeup based on the grid alignment, thereby realizing the migration of makeup on the original face image.

However, in the makeup migration method mentioned above, the segmented makeup image region is limited by the face pose and face shape of the makeup face image, which results in an unnatural fusion effect of the makeup information in the original face image after fusing to the original face image.

SUMMARY

In order to solve the above technical problems or at least partially solve the above technical problems, the present disclosure provides a face image processing method, apparatus, device, and medium which achieve refined migration of makeup between images, and perform corresponding makeup migration based on each of the face parts, thereby improving the robustness of makeup migration.

Embodiments of the disclosure provide a face image processing method, including: acquiring a first feature map and a second feature map of a current layer, and generating a plurality of original makeup feature regions corresponding to a plurality of face parts according to the first feature map, generating a plurality of reference makeup feature regions corresponding to the plurality of face parts according to the second feature map, performing makeup migration calculation on each of the original makeup feature regions and a corresponding reference makeup feature region to acquire a plurality of candidate makeup feature regions, stitching the plurality of candidate makeup feature regions to generate a target feature map, and judging whether the target feature map satisfies a preset decoding condition. In a case where the preset decoding condition is satisfied, the target feature map is decoded to acquire a target face image Embodiments of the disclosure further provide a face image apparatus, including: a first generation module, configured to acquire a first feature map and a second feature map of a current layer, and generate a plurality of original makeup feature regions corresponding to a plurality of face parts according to the first feature map, a second generation module, configured to generate a plurality of reference makeup feature regions corresponding to the plurality of face parts according to the second feature map, an acquisition module, configured to perform makeup migration calculations on each of the original makeup feature regions and a corresponding reference makeup feature region to acquire a plurality of candidate makeup feature regions, a stitching module, configured to stitch the plurality of candidate makeup feature regions to generate a target feature map, a judgment module, configured to judge whether the target feature map satisfies a preset decoding condition, and a decoding module, configured to decode the target feature map to acquire a target face image, in a case where the preset decoding condition is satisfied.

Embodiments of the disclosure further provide an electronic device, including: a processor, a memory, for storing instructions executable by the processor. The processor is configured to read the executable instructions from the memory, and execute the executable instructions to implement the face image processing methods provided by the disclosure.

Embodiments of the disclosure further provide a computer readable storage medium. The storage medium stores a computer program. The computer program is used to execute the face image processing methods provided by embodiment of the disclosure.

Compared to the prior art, the technical solution provided by the embodiments of the present disclosure has the following advantages.

The face image processing solution provided by the embodiments of the present disclosure acquires a first feature map and a second feature map of a current layer, according to the first feature map, and generates a plurality of original makeup feature regions corresponding to a plurality of face parts according to the first feature map. Further, the makeup migration calculations are performed on each of original makeup feature regions and a corresponding reference makeup feature region, to acquire a plurality of candidate makeup feature regions. The plurality of candidate makeup feature regions is then stitched to generate a target feature map, and whether the target feature map satisfies a preset decoding condition is judged. In the case where the target feature map satisfies the preset decoding condition, the target feature map is decoded to acquire a target face image. As such, refined migration of makeup between images is achieved, and corresponding makeup migration is performed based on each of the face parts, thereby improving the robustness of makeup migration.

BRIEF DESCRIPTION OF DRAWINGS

In combination with the accompanying drawings and with reference to the following specific embodiments, the above-mentioned and other features, advantages, and aspects of the present disclosure will become more apparent. Throughout the drawings, the same or similar reference labels indicate the same or similar elements. It should be understood that the drawings are schematic and that the components and elements may not necessarily be drawn to scale.

FIG. 1 is a flow diagram illustrating a face image processing method provided by the present disclosure;

FIG. 2 is a logic diagram illustrating a face image processing logic provided by the present disclosure;

FIG. 3 is a flow diagram illustrating another face image processing method provided by the present disclosure;

FIG. 4 is a scene diagram illustrating a face image processing provided by the present disclosure;

FIG. 7 is a flow diagram illustrating another face image processing method provided by the present disclosure;

FIG. 8 is a scene diagram illustrating the generation of an initial mean feature map provided by the present disclosure;

FIG. 9 is a scene diagram illustrating the generation of an initial variance feature map provided by the present disclosure;

FIG. 10 is a scene diagram illustrating the generation of a first mean feature matrix provided by the present disclosure;

DETAILED DESCRIPTION

Figure 5:
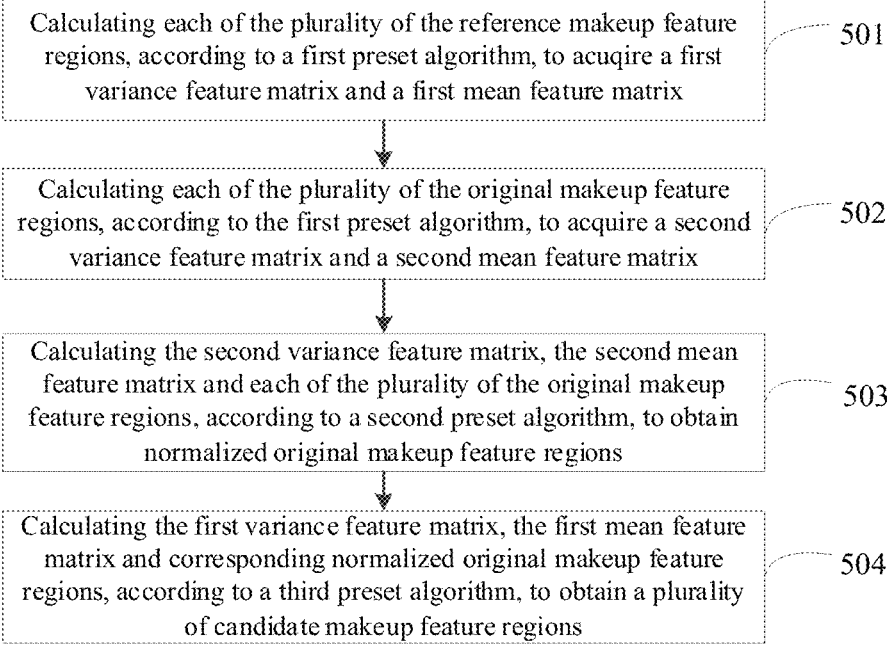
FIG. 5 is a flow diagram illustrating another face image processing method provided by the present disclosure.

The following will provide a more detailed description of the embodiments of the present disclosure in reference to the accompanying drawings. While the drawings show some embodiments of the present disclosure, it should be understood that the present disclosure can be implemented in various forms and should not be interpreted as being limited to the embodiments disclosed herein. Instead, these embodiments are provided to more thoroughly and completely understand the present disclosure. It should be understood that the drawings and embodiments of the present disclosure are for illustrative purposes only and are not intended to limit the scope of the present disclosure.

It should be understood that the various steps described in the method embodiments of the present disclosure may be performed in different orders and/or in parallel. In addition, the method embodiments may include additional steps and/or omit the steps shown. The scope of the present disclosure is not limited in this respect.

The term "includes" and its variations used in this document are open inclusives, meaning "includes but is not limited to". The term "based on" means "based at least partially on". The term "one embodiment" indicates "at least one embodiment", while the term "another embodiment" indicates "at least one additional embodiment". The term "some embodiments" indicates "at least some embodiments". The relevant definitions of other terms will be given in the following description.

It should be noted that the terms "first", "second", and so on mentioned in the present disclosure are only used to distinguish between different devices, modules, or units, and are not intended to limit the order or interdependence of the functions performed by these devices, modules, or units.

It should be noted that the qualifiers "one" and "plurality" used in the present disclosure are illustrative rather than limiting. Those skilled in the art should understand that unless otherwise specified in the context, these qualifiers should be understood as "one or more".

The names of the messages or information exchanged between a plurality of devices in the embodiments of the present disclosure are only for illustrative purposes and are not intended to limit the scope of these messages or information.

To solve the above problems, the present disclosure provides a makeup information migration network based on convolutional networks. In this makeup information migration network, the makeup information can be learned layer by layer in progression from a plurality of levels, and the adaptive fusion can be performed between different levels of makeup information and the original face image. Furthermore, based on convolutional networks, the migration of makeup information based on image feature dimensions is achieved, which improves the naturalness of makeup migration.

The face image processing method in the embodiments is introduced below in conjunction with specific embodiments.

FIG. 1 is a flow diagram illustrating a face image processing method provided by the present disclosure. The method can be executed by a face image processing apparatus, which can be implemented in software and/or hardware and generally integrated in an electronic device. As shown in FIG. 1, the method includes the following steps.

Step 101, acquiring a first feature map and a second feature map of a current layer, and generating a plurality of original makeup feature regions corresponding to a plurality of face parts according to the first feature map.

It should be noted that in the embodiment, the makeup information migration between two images is performed layer by layer, wherein the makeup migration between each of layers can be progressed layer by layer.

Thus, as shown in FIG. 2, the makeup migration calculations between layers can be regarded as a pyramid calculation for a plurality of layers, and the results of the makeup migration for a plurality of layers are transmitted in the form of a pyramid. Therefore, a plurality of granularities between the two images for the fusion of makeup information are taken into account, which can greatly improve the naturalness of the fusion of makeup information. Even if there are large pose differences between the face images in the two images, it can be compensated through progressive fusion calculations, thereby improving the robustness of makeup migration.

Below is an explanation of the makeup migration calculation for each layer.

In the embodiment, in response to the makeup migration request, the original image and the reference image corresponding to the makeup migration request are acquired, and instructions for performing multi-layer makeup migration calculations on the original image and reference image are generated, which facilitates the calculation of the makeup migration for a plurality of layers according to the instructions. In the makeup migration calculation of the current layer, the first feature map and the second feature map of the current layer are acquired. The first feature map can be understood as the original image to be fused with makeup information, for example, it can be a plain face image. In the case where the current layer is the initial layer, the first feature map can obtained by extracting with performing convolution calculations of the convolution layers related to network according to the original image, etc. . . . In the case where the current layer is not the initial layer, the corresponding first feature map is related to the calculation result of the makeup migration in the previous layer, which will be explained in subsequent embodiments, and will not be elaborated here.

In addition, the second feature map can be understood as the reference image to be extracted for makeup information, for example, it can be a makeup image with heavy makeup. In the case where the current layer is the initial layer, the second feature map can be obtained by extracting with performing convolution calculations of convolutions layers related to network according to the reference image. In the case where the current layer is not the initial layer, the corresponding second feature map is related to the second feature map obtained by convolution calculations in previous layer, which will be explained in subsequent embodiments and will not be elaborated here.

In this embodiment, in order to compensate for the pose difference between the original image corresponding to the first feature map and the reference image corresponding to the second feature map, makeup migration calculations can be performed respectively based on face parts, wherein the face parts include a left eye part, a right eye part, a mouth part, a nose part, a cheek part, etc.

Therefore, in this embodiment, the plurality of original makeup feature regions corresponding to the plurality of face parts are generated according to the first feature map, wherein each of the original makeup feature regions corresponds to a face part. For example, the original makeup feature includes the makeup feature region of the eye part etc. The original makeup feature regions in the embodiments correspond to makeup features of the respective face parts, for example, in the case where the makeup corresponds to blush, the corresponding makeup features include a color feature, a shape feature, a region feature, etc.

In the actual execution process, the aim is to migrate the makeup information from the second feature map to the original image corresponding to the first feature map. Therefore, in order to avoid affecting the shape of the human face in the original image, it is ensured that only the makeup information is migrated to the original image. For example, only the color of the lips in the reference image is migrated to the lips in the original image without changing the shape of the lips in the original image. Therefore, the corresponding original makeup feature region in the first feature map can also include the shape feature corresponding to the face part, etc. . . .

Step 102, generating a plurality of reference makeup feature regions corresponding to the plurality of face parts according to the second feature map.

In the embodiment, in order to improve the naturalness of the makeup migration, the plurality of reference makeup feature regions corresponding to the plurality of face parts are generated according to the second feature map, wherein each of the reference makeup feature regions corresponds to a face part. For example, the reference makeup feature regions include a makeup feature region of the eye part, and so on. The plurality of reference makeup feature regions in the embodiment correspond to makeup features of respective face parts, for example, in the case where the makeup corresponds to blush, the corresponding makeup features include a color feature, a shape feature, a region feature, etc.

Step 103, performing makeup migration calculations on each of the original makeup feature regions and a corresponding reference makeup feature region to acquire a plurality of candidate makeup feature regions.

In the embodiment, the makeup migration calculations are performed on each of the original makeup feature regions and a corresponding reference makeup feature region to generate a plurality of candidate makeup feature regions. Each of the candidate makeup feature regions can be understood as the image feature of the corresponding face part in the original image after migrating the makeup information of the corresponding face part in the reference image.

Step 104, stitching the plurality of candidate makeup feature regions to generate a target feature map, and judging whether the target feature map satisfies a preset decoding condition.

As mentioned above, each of the candidate makeup feature regions only corresponds to one face part. Therefore, in order to acquire a complete face feature map after migrating the makeup, stitching the plurality of candidate makeup feature regions is necessary, to generate the target feature map. The method of stitching feature maps can be implemented by referring to existing technologies, which will not be elaborated here.

Due to the difference in the number of convolution kernels used for calculating the plurality of original makeup feature regions and the plurality of reference makeup feature regions in each of the layers, the refined degree of makeup migration of the reference makeup feature region calculated for each current layer is different. The earlier the layer is, i.e., the lowest layer, the more coarse the corresponding refined degree is. Therefore, in the embodiment, in order to gradually improve the refined degree of makeup migration, judging whether the target feature map satisfies the preset decoding conditions is necessary, to determine whether the refined degree of makeup migration in the current layer has reached the required level.

It should be noted that the method of judging whether the target feature map satisfies the preset decoding conditions may vary in different application scenes. An example for illustration is as follow.

In an embodiment of the present disclosure, the total number of layers for calculation is preset based on experimental data, for example, 3 layers are preset for calculations, etc. The order of each layer is determined from 1, and whether the current layer is the preset order layer is judged, for example, the present order layer is the third layer, etc. In the embodiment, in the case where the current layer is the preset order layer, the target feature map satisfying the preset decoding conditions is determined.

In another embodiment of the present disclosure, the first makeup feature corresponding to the target feature map in each layer is extracted, and the second makeup feature corresponding to the second feature map is extracted. The preset loss function calculates the loss value between the first makeup feature and the second makeup feature. In the case where the loss value is less than the preset loss threshold, the current layer with a good effect of makeup migration is proved, the makeup information of the reference image corresponding to the second feature map is substantially migrated to the original image corresponding to the first feature map, so that, the target feature map in the current layer satisfying the preset decoding conditions is determined.

Step 105, in a case where the preset decoding condition is satisfied, the target feature map is decoded to acquire the target face image.

In the embodiment, in the case where the preset decoding conditions are satisfied, it indicates that the effect of makeup migration is relatively ideal. Therefore, the corresponding face image is acquired based on the target feature map. Since the target feature map is feature-dimensional information, decoding processing is required to perform on the target feature map to acquire the target face image. In the embodiment, the decoding processing can be performed according to the decoding layer of the relevant processing network.

In an embodiment of the present disclosure, as shown in FIG. 3, after the above step 104, the method further includes the following steps.

Step 301, in the case where not satisfying the preset decoding condition, updating the first feature map of the current layer according to the target feature map, as the first feature map to be processed in the next layer.

In the embodiment, in the case where the preset decoding conditions are not satisfied, it indicates that the effect of the makeup migration of the current layer is not ideal, and then it only need to start the makeup migration calculation of the next layer.

In the embodiment, in order to improve the refined degree and efficiency of the makeup migration calculation of the next layer, the result of the makeup migration calculation of the current layer is used as the input of the makeup migration calculation of the next layer. In other words, the first feature map of the current layer is updated according to the target feature map, to use as the first feature map to be processed in the next layer. Further, the convolution calculation of a more refined convolution layer in the network can be performed on the first feature map to be processed, to acquire a plurality of original makeup feature regions of the next layer.

Step 302, stitching the plurality of reference makeup feature regions of the current layer, and updating the second feature map according to a stitched makeup feature map, as the second feature map to be processed in the next layer.

Similarly, in the embodiment, the convolution calculation result of the second feature map of the current layer can also be transmitted, and a plurality of reference makeup feature regions of the current layer can be stitched. And the second feature map can be updated according to the stitched makeup feature map, to use as the second feature map to be processed in the next layer.

Further, the convolution calculation of a more refined convolution layer in the convolution network can be performed on the second feature map to be processed, resulting in the plurality of reference makeup feature regions of the next layer.

In general, as shown in FIG. 4, in the embodiment, it is divided into two branches. One branch can be a generative adversarial network (GAN), with the input being the original image corresponding to the first feature map (depicted as a natural face image), and the output being the face image after makeup migration. The other branch is a makeup extraction network, with the input being the reference image corresponding to the second feature map (depicted as a makeup face image). The network structure for calculating the corresponding makeup feature regions is the same for both branches at each layer. For example, for the first layer of makeup migration calculation, the extraction network layers of the first feature map and second feature map have the same structure.

In the embodiment, in the case where the preset layer order is 3, firstly the makeup migration calculation of the target feature map for the first layer is calculated according to the original image and the reference image. The first feature map based on the target feature map is used as the input of the second layer. The second feature map, generated based on the reference makeup feature regions obtained from the other branch, is used as the input of the second layer. The makeup migration calculation of the second layer is further performed based on the first feature map and the second feature map. The target feature map calculated based on the second layer is used as the first feature map of the input of the third layer. The second feature map, generated from the reference makeup feature regions obtained based on the other branch, is used as the second feature map of the input of the third layer. The makeup migration calculation of the third layer is further performed based on the first feature map and the second feature map. The calculated target feature map is decoded through the decoding layer of the first branch to acquire the corresponding target face image. The target face image is the original face image with the migrated makeup information of reference image.

Therefore, during the makeup calculation for the plurality of layers, the makeup with different granularities can be migrated, even for the makeup information with heavy makeup and inconsistent face poses, still being capable of achieving a better migration effect.

In summary, the face image processing method of the present disclosure obtains the first feature map and second feature map of the current layer. According to the first feature map, the plurality of original makeup feature regions corresponding to the plurality of face parts are generated. Further, the makeup migration calculations are performed on each of the original makeup feature regions and a corresponding reference makeup feature region to acquire the plurality of candidate makeup feature regions. The plurality of candidate makeup feature regions are stitched together to generate a target feature map, and whether the target feature map satisfies the preset decoding conditions is judged. In the case where the preset decoding conditions are satisfied, the target feature map is decoded to acquire the target face image. Therefore, the refined makeup migration between images is achieved, and a corresponding makeup migration is performed based on each of the face parts to improve the robustness of makeup migration.

Based on the above embodiments, in calculating the makeup migration calculation in each layer, image features with a plurality of channels are extracted based on the plurality of channels with different refined degrees, and the makeup information is extracted to enhance the migration degree of the makeup information, and particularly improve the migration effect for makeup images with heavy makeup.

The following embodiments explain the makeup migration calculation process for each of original makeup feature regions and the corresponding reference makeup feature region in embodiments of the present disclosure.

In one embodiment of the present disclosure, as shown in FIG. 5, the performing makeup migration calculations on each of the original makeup feature regions and a corresponding reference makeup feature region to acquire the plurality of candidate makeup feature regions includes the following steps.

Step 501, calculating each of the reference makeup feature regions, according to a first preset algorithm, to acquire a first variance feature matrix and a first mean feature matrix.

In the embodiment, feature performance of each of the reference makeup feature regions is extracted according to both dimensions, variance and mean. That is, each of the reference makeup feature region is calculated according to the first preset algorithm, to acquire the first variance feature matrix and the first mean feature matrix.

Step 502, calculating each of the original makeup feature regions, according to the first preset algorithm, to acquire a second variance feature matrix and a second mean feature matrix.

Similarly, in the embodiment, feature performance of each of the original makeup feature regions is extracted according to variance dimension and mean dimension. That is, each of the original makeup feature regions is calculated according to the first preset algorithm, to acquire the second variance feature matrix and the second mean feature matrix.

Step 503, calculating the second variance feature matrix, the second mean feature matrix and each of the original makeup feature regions, according to a second preset algorithm, to acquire normalized original makeup feature regions.

In the embodiment, the second variance feature matrix, the second mean feature matrix and each of the original makeup feature regions, are calculated, according to the second preset algorithm, to acquire the normalized original makeup feature regions. In other words, in the embodiment, firstly the original makeup feature region is normalized to remove features that affect the migration effect of the makeup in the original makeup feature regions, for example, a noise feature or an original makeup feature in the original makeup feature regions.

In the embodiment of the present disclosure, the second reference value can be acquired according to the second variance feature matrix and each of the original makeup feature regions. Further, the normalized original makeup feature region can be acquired according to the second reference value and the second mean feature matrix.

For example, in some possible embodiments, in order to avoid the second mean feature removing some unique makeup features on the face, for example, the mole on the face is removed, to affect the recognition of the face, the product value of the second variance feature matrix and the preset coefficient can be calculated as the second reference value. The preset coefficient is less than 1 to weaken the removal degree of the face characteristics in the original image. Further, the product value feature difference between each of the original makeup feature regions and the second variance feature matrix is calculated, and the feature ratio between the difference makeup feature region and the second mean feature matrix is calculated to acquire the normalized original makeup feature region.

In some possible embodiments, the feature difference between each of the original makeup feature regions and the second variance feature matrix is calculated to acquire the difference makeup feature region as the second reference value. The feature ratio between the difference makeup feature region and the second mean feature matrix is calculated to acquire the normalized original makeup feature region.

In the embodiment, the calculation process of the normalized original makeup feature region can be as shown in formula (1) as follows. In formula (1), $$F'^{i}_{src\_\{R\}}$$

is the normalized original makeup feature region, $$F^{i}_{src\_\{R\}}$$

is the original makeup feature region, $$\mu^{i}_{src\_\{R\}}$$

is the second variance feature matrix, $$\alpha^{i}_{src\_\{R\}}$$

is the second mean feature matrix, i is the i-th calculation layer, and R corresponds to the corresponding face part. It should be noted that in the embodiment, the same characters in different formulas represent the same parameters, and in different formulas, the parameters of the same letter are not defined repeatedly.

$$F'^{i}_{src\_\{R\}} = \frac{F^{i}_{src\_\{R\}} - \mu^{i}_{src\_\{R\}}}{\alpha^{i}_{src\_\{R\}}} \qquad \text{formula (1)}$$

Step 504, calculating the first variance feature matrix, the first mean feature matrix and corresponding normalized original makeup feature regions, according to a third preset algorithm, to acquire a plurality of candidate makeup feature regions.

In the embodiment, according to the third preset algorithm, the first variance feature matrix, the first mean feature matrix, and the corresponding normalized original makeup feature region are calculated to acquire the plurality of candidate makeup feature regions. That is, on the basis of normalized original images, the makeup migration is performed, further improving the effect of makeup migration.

In the embodiments of the present disclosure, the third reference value can be acquired according to the first variance feature matrix and the normalized original makeup feature region. The candidate makeup feature regions can be acquired according to the third reference value and the first mean feature matrix.

For example, in one embodiment of the present disclosure, in order to avoid the makeup information in the reference image being light makeup, which results in incomplete extraction of makeup information, the feature product of the first variance feature matrix and the normalized original makeup feature region can be calculated to acquire a product makeup feature region as the third reference value. The reference product value of the first mean feature matrix and a preset coefficient, which here is greater than 1, is calculated which also enhances the corresponding reference makeup feature region. A sum of the feature product and the reference product value is calculated to acquire the candidate makeup feature regions corresponding to the face parts.

For example, in one embodiment of the present disclosure, the feature product of the first variance feature matrix and the normalized original makeup feature region can be calculated to acquire the product makeup feature region as the third reference value. Further, the sum of the makeup feature region and the first mean feature matrix feature is calculated to acquire the plurality of candidate makeup feature regions.

In the embodiment, the calculation logic of the plurality of candidate makeup feature regions can be as shown in formula (2) as follows. In formula (2), $$\gamma^{i}_{\{R\}}$$

is the first variance feature matrix, $$\beta^i_{\{R\}}$$

is the first mean feature matrix, and $$\hat{F}^i_{src\_\{R\}}$$

is the candidate makeup feature region corresponding to the face part.

$$\hat{F}^i_{src\_\{R\}} = \gamma^i_{\{R\}} \frac{F^i_{src\_\{R\}} - \mu^i_{src\_\{R\}}}{\alpha^i_{src\_\{R\}}} + \beta^i_{\{R\}} \qquad \text{formula (2)}$$

Figure 6:
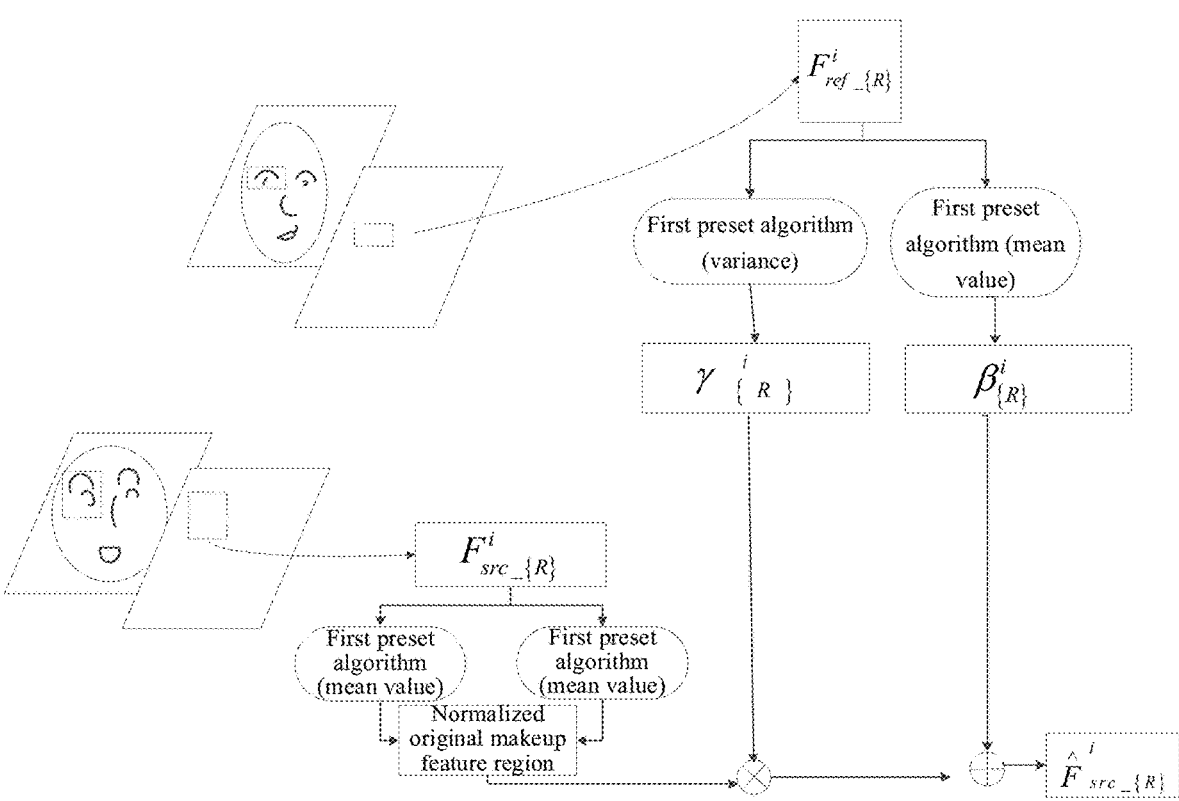
FIG. 6 is a scene diagram illustrating another face image processing provided by the present disclosure.

To enable those skilled in the art to better understand the above-mentioned migration calculation algorithm, the following is a description of the logic of the entire migration algorithm in combination with specific embodiments. As shown in FIG. 6, When explaining the calculation of makeup migration, an example in which the face part is the left eye part is illustrated.

Referring to FIG. 6, firstly, reference makeup feature regions $$F^i_{ref\_\{R\}}$$

and original makeup feature regions $$F^i_{src\_\{R\}}$$

corresponding to the left eye are extracted from the first feature map and the second feature map. Then, each of the reference makeup feature regions is calculated according to the first preset algorithm to acquire the first variance feature matrix $$\gamma^i_{\{R\}}$$

and the first mean feature matrix $$\beta^i_{\{R\}}.$$

Furthermore, each of the original makeup feature regions is calculated according to the first preset algorithm, to acquire the second variance feature matrix $$\mu^i_{src\_\{R\}}$$

and the second mean feature matrix $$\alpha^i_{src\_\{R\}}.$$

Firstly, the normalized original makeup feature regions are acquired according to the second variance feature matrix $$\mu^i_{src\_\{R\}}$$

and the second mean feature matrix $$\alpha^i_{src\_\{R\}}.$$

Secondly, the feature product of the first variance feature matrix and the normalized original makeup feature regions is calculated to acquire the product makeup feature region. Finally, the sum of the makeup feature regions and the first mean feature matrix features is calculated to acquire the candidate makeup feature regions $$\hat{F}^i_{src\_\{R\}}.$$

Thus, in the embodiment, makeup region features based on face parts and makeup migration based on variance and mean channels are implemented to improve the efficiency of makeup migration.

In the embodiment, in order to ensure that the variance feature matrix and the mean feature matrix can reflect the makeup information with various refined granularity, the first preset algorithm may also be an algorithm that extracts the corresponding feature matrix based on a plurality of channels.

Since the first variance feature matrix and the first mean feature matrix, and corresponding second variance feature matrix and corresponding second mean feature matrix are all acquired based on the first preset algorithm, in the embodiment, the calculation process of the first mean feature matrix and the corresponding second variance feature matrix is illustrated as an example for explanation. The explanation is as follows.

In the embodiment, as shown in FIG. 7, calculating each of the reference makeup feature regions, according to the first preset algorithm, to acquire the first variance feature matrix and the first mean feature matrix, includes the follow steps.

Step 701, gridding each of the reference makeup feature regions, according to a plurality of different preset window sizes, and generating initial variance feature maps and initial mean feature maps for each of the preset window sizes, according to gridded reference makeup feature regions.

In the embodiment, a plurality of preset window sizes are preset and the plurality of preset window sizes have different sizes, for example, 1*1, 2*2, 3*3 . . . , etc. In the embodiment, in order to ensure that the feature matrix in each of the window sizes can be acquired, the maximum size of the preset window size is the same as the size of the reference makeup feature region.

In the embodiment, each reference makeup feature region can be gridded according to the plurality of different preset window sizes to generate a grid feature map corresponding to each of the preset window sizes. The number of grids in each of the grid feature maps corresponds to the preset window size. For example, in the case where the preset window size is 1*1, the number of grids in the grid feature map is 1, and in the case where the preset window size is 2*2, the number of grids in the gird feature map is 4, and so on.

Further, the initial variance feature maps and initial mean feature maps are generated for each of the preset window sizes according to the gridded reference makeup feature region.

In some possible embodiments, a preset number of sample feature points are randomly determined in each of the grids of the divided reference makeup feature regions. The preset number can be calibrated according to experimental data. Further, the feature mean values of all sample feature points are calculated, and the initial mean feature maps are generated for each of the preset window sizes according to the feature mean values of all the grids.

In the embodiment, a preset number of sample feature points are randomly determined in each of the grids of the divided reference makeup feature regions. The preset number can be calibrated according to experimental data, and further the feature variance values of all of the sample feature points are calculated. The initial variance feature maps of each of the preset window sizes are generated according to all of feature variances of all of the grids.

In other possible embodiments, the feature mean value of all of the feature values in each of the grids of the grid feature maps is calculated, and an initial mean feature map is generated for each of the preset window sizes according to the feature mean values of all of the grids. Thus, each of the reference makeup feature regions is divided into a plurality of feature channels. For example, in the case where the preset window sizes include 3, the reference makeup feature region is divided into 3 channels to calculate the initial mean feature map in the 3 channels. The number of feature mean values corresponding to each of the channels is greater, which means the corresponding reference makeup feature region is divided in more refined granularity and the makeup information of the corresponding reference makeup feature region can be extracted from more details.

For example, as shown in FIG. 8, in the case where the preset window size includes 2*2, the reference makeup feature region is grided into 4 grids, and the mean value of all feature values in each of the grids is calculated to acquire 4 mean values. The corresponding initial mean feature map is generated according to the 4 mean values a1, a2, a3 and a4. In the case where the preset window size includes 1*1, the reference makeup feature region is grided into 1 grid, and the mean value of all feature values in each of the grids is calculated to acquire 1 mean value. The corresponding initial mean feature map is generated according to the 1 mean value a5.

In the embodiment, the feature variance value of all feature values in each of the grids of the grid feature maps is calculated, and initial variance feature maps are generated for each of the preset window sizes according to the feature variance values of all of the grids. Thus, each of the reference makeup feature regions is divided into a plurality of feature channels.

For example, in the case where the preset window size includes 3, the reference makeup feature region is divided into 3 channels to calculate the initial variance feature maps for each channel. The number of feature mean values of each of the channels is greater, which means the corresponding reference makeup feature region is divided in more refined granularity, and the makeup information of the corresponding reference makeup feature region can be extracted from more details.

For example, as shown in FIG. 9, in the case where the preset window size includes 2*2, the reference makeup feature region is grided into 4 grids, and the variance of all feature values in each of the grids is calculated to acquire 4 variance values. The corresponding initial mean variance feature map is generated according to the 4 variance values b1, b2, b3 and b4. In the case where the preset window size includes 1*1, the reference makeup feature region is grided into 1 grid, and the variance of all feature values in each of the grids is calculated to acquire 1 variance value. The corresponding initial mean variance feature map is generated according to the 1 variance value b5.

Step 702, scaling all of the initial mean feature maps and the initial variance feature maps according to the size of the corresponding original makeup feature regions, to acquire a plurality of target mean feature maps and a plurality of target variance feature maps.

In the embodiment, for the convenience of subsequent calculations between the feature maps, all of the initial mean feature maps and initial variance feature maps are scaled according to the size of the corresponding original makeup feature regions to acquire a plurality of target mean feature maps and a plurality of target variance feature maps. The size of each of the target mean feature maps and the size of each of the target variance feature maps are the same as the size of the corresponding original makeup feature region. The scaling includes nearest-neighbor interpolation etc. . . .

Step 703, calculating the plurality of target mean feature maps and the plurality of target variance feature maps, respectively, according to the corresponding original makeup feature regions, to generate the first mean feature matrix and the first variance feature matrix.

In the embodiment, the target mean feature matrix reflects characteristics of the feature values of the reference makeup region in the mean, and the target variance feature matrix reflects characteristics of the feature values of the reference makeup region in the variance. Therefore, a plurality of target mean feature maps are calculated based on the corresponding original makeup feature region, to generate a first mean feature matrix, which reflects the migration matrix in the mean dimension of the reference makeup region and the original makeup region, and a plurality of target variance feature maps are calculated based on the corresponding original makeup feature region, to generate a first variance feature matrix, which reflects the migration matrix in the variance dimension of the reference makeup region and the original makeup region.

It should be noted that in different application scenes, the manner of calculating the plurality of target mean feature maps and the plurality of target variance feature maps respectively, according to the corresponding original makeup feature region, to generate the first mean feature matrix and the first variance feature matrix, may be different.

In some possible embodiments, when training a deep learning model with a large number of sample data in advance, the input of the deep learning model is the original makeup feature region and the plurality of target mean feature maps, and the output is the first mean feature matrix. The input of the deep learning model is the original makeup feature region and the plurality of target variance feature maps, and then the output is the first variance feature matrix.

Thus, the corresponding first mean feature matrix and first variance feature matrix can be acquired based on the trained deep learning model.

In other possible embodiments, the degree of target feature map contribution is adaptively selected for each branch through a network, each of the reference makeup feature regions and the corresponding original makeup feature region are stitched, and the stitched makeup feature region is calculated, for example, the bilateral convolution calculation is performed according to a Gate network etc., to generate a plurality of weight features corresponding to each of the target mean feature maps and each of the target variance feature maps. The number of the plurality of weight features is the same as the number of channels corresponding to the target mean feature maps and the target variance feature maps.

In some possible embodiments, the calculation method of the weight features can refer to formula (3) below, in formula (3), $$\alpha^k_{\beta\_\{R\}}$$

is the weight feature and k is the number of preset window sizes.

$$\alpha^k_{\beta\_\{R\}} = \text{Softmax}\left(\text{Conv}_\theta\left(\text{Cat}\left(F^i_{ref\_\{R\}}, F^i_{src\_\{R\}}\right)\right)\right) \quad \text{formula (3)}$$

In the embodiment, all target mean feature maps and their corresponding weight features are calculated according to a fourth preset algorithm, to acquire a first mean feature matrix. In the embodiment, a plurality of first reference values are acquired according to the target mean feature maps and the corresponding weight features, and further the first mean feature matrix is acquired according to the plurality of first reference values.

For example, the product value of each of the weight features and the corresponding target mean feature map is calculated, the product of the product value and a preset value is calculated, and the top preset numbers of values of the product value are selected as the first reference values. Further, the sum or average of the plurality of first reference values is set as the first mean feature matrix.

For example, the product value of each of the target mean feature maps and the corresponding weight feature is calculated, and the sum of a plurality of product values is calculated to acquire the first mean feature matrix. The sum of the plurality of weight features is equal to 1.

In the embodiment, the calculation formula for the first mean feature matrix can be as shown in formula (4) below, wherein, in formula (4), $$\beta^i_{\{R\}}$$

is the first mean feature matrix corresponding to the face part R.

$$\beta^i_{\{R\}} = \sum^K_{k=1}\alpha^k_{\beta\_\{R\}}\beta^{i\_k}_{\{R\}} \quad \text{formula (4)}$$

Further, all target variance feature maps and their corresponding weight features are calculated according to a fourth preset algorithm to acquire the first variance feature matrix.

In the embodiment, all target variance feature maps and their corresponding weight features are calculated according to a fourth preset algorithm to acquire the first variance feature matrix. The calculation method of the first variance feature matrix follows the calculation method of the first mean feature matrix described above, and therefore will not be repeated here.

To enable those skilled in the art to have a clearer understanding of the calculation method of the first mean feature matrix and the first variance feature matrix, the following specific scene example is provided for illustration. In this scene, the preset window size includes k, the network for calculating the corresponding weight feature is a Gate network, and the object for calculation is the first mean feature matrix. In addition, the calculation method of the first variance feature matrix in the embodiment is similar to the calculation method of the first mean feature matrix, which will not be repeated here.

Referring to FIG. 10, in the embodiment, the reference makeup feature region $$F^i_{ref\_\{R\}}$$

corresponding to the R face part and the original makeup feature region $$F^i_{src\_\{R\}}$$

corresponding to the face part are firstly acquired, wherein the size of $$F^i_{src\_\{R\}}$$

is $C*h_s*w_s$.

Each of the reference makeup feature regions is grided according to the plurality of different preset window sizes to generate a grid feature map corresponding to each of the preset window sizes. The feature mean of all feature values in each of the grids in the grid feature map is calculated. The initial mean feature maps from $$\beta^{i\_1}_{sapp\_\{R\}} \text{ to } \beta^{i\_k}_{sapp\_\{R\}}$$

are generated for each of the preset window sizes, according to all of the feature means of all of the grids.

Furthermore, all initial mean feature maps and all initial variance feature maps are scaled respectively according to the size of the corresponding original makeup feature regions to acquire the plurality of target mean feature maps and the plurality of target variance feature maps from $$\beta^{i\_1}_{\{R\}} \text{ to } \beta^{i\_K}_{\{R\}}.$$

All the size of each of the objective variance maps is $C*h_s*w_s$.

In the embodiment, each of the reference makeup feature regions and the corresponding original makeup feature region are stitched, and the stitched makeup feature area is calculated to generate weight features from $$\alpha_{(R)}^{i\_1} \text{ to } \alpha_{(R)}^{i\_k},$$

corresponding to each of the target mean feature maps. Further, the product value of each of the target mean feature maps and the corresponding weight features is calculated, and the sum of the plurality of product values is calculated to acquire the first mean feature matrix $$\beta_{(R)}^{i}.$$

Of course, in other possible embodiments, the first preset algorithm mentioned above can also be other algorithms. For example, the preset corresponding relationship is queried according to the region size of each of the reference makeup feature regions, to determine the target window size. The target window size is grided. Based on the feature mean value of all features in each of the grids, an initial mean feature map is generated for each of the preset window sizes according to the feature mean values of all of the grids. After scaling the size of the initial mean feature map according to the size of the corresponding original makeup feature region, a target mean feature map with the same size as the original makeup feature region is acquired.

Further, based on the target mean feature map, the corresponding first mean feature matrix is determined. The same approach also can be used to calculate the first variance feature matrix, etc. In the embodiment, the window size which matches the size of each of the reference makeup feature regions is directly selected for calculating the relevant mean feature maps, which balances the computational pressure and accuracy.

In summary, in the face image processing method of the present disclosure, in calculating the makeup migration calculation in each layer, image features with a plurality of channels are extracted based on the plurality of channels with different refined degrees, to extract the makeup information, in order to enhance the migration degree of the makeup information, to improve the migration effect for makeup images with heavy makeup.

In order to implement the above embodiments, the present disclosure further provides a face image processing device.

Figure 11:
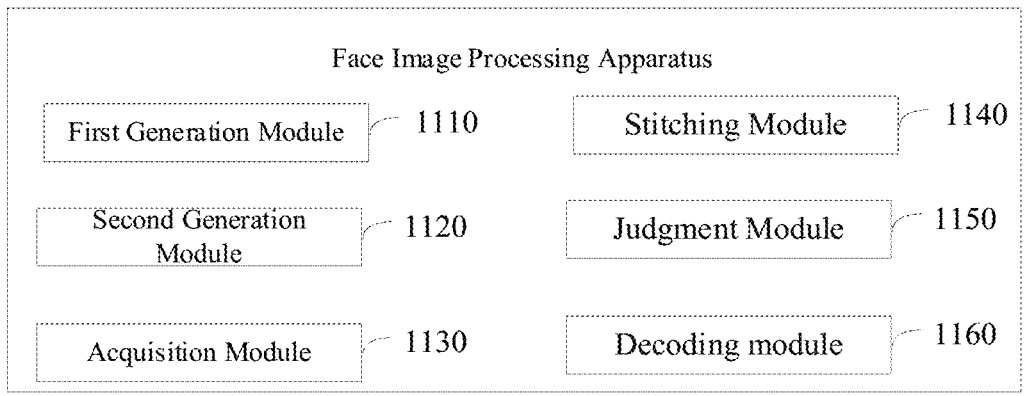
FIG. 11 is a schematic structural diagram of a face image processing apparatus provided by the present disclosure.

FIG. 11 is a schematic structural diagram of a face image processing apparatus provided by the present disclosure. The apparatus can be implemented by software and/or hardware and is generally integrated in an electronic device. As shown in FIG. 11, the apparatus includes: a first generation module 1110, a second generation module 1120, an acquisition module 1130, a stitching module 1140, a judgment module 1150, and a decoding module 1160.

The first generation module 1110 is configured to acquire a first feature map and a second feature map of a current layer, and generate a plurality of original makeup feature regions corresponding to a plurality of face parts according to the first feature map.

The second generation module 1120 is configured to generate a plurality of reference makeup feature regions corresponding to the plurality of face parts according to the second feature map.

The acquisition module 1130 is configured to perform makeup migration calculations on each of the plurality of original makeup feature regions and a corresponding reference makeup feature region to acquire a plurality of candidate makeup feature regions.

The stitching module 1140 is configured to stitch the plurality of candidate makeup feature regions to generate a target feature map.

The judgment module 1150 is configured to judge whether the target feature map satisfies a preset decoding condition.

The decoding module 1160 is configured to decode the target feature map to acquire a target face image, in a case where the preset decoding condition is satisfied.

The face image processing device provided in the present disclosure can execute the face image processing method of any embodiment of the present disclosure, and has functional modules and beneficial effects corresponding to the execution of the method.

In order to implement the above embodiments, the present disclosure also provides a computer program product containing computer program/instructions. When the computer program/instructions are executed by a processor, they implement the face image processing method of the above embodiments.

Figure 12:
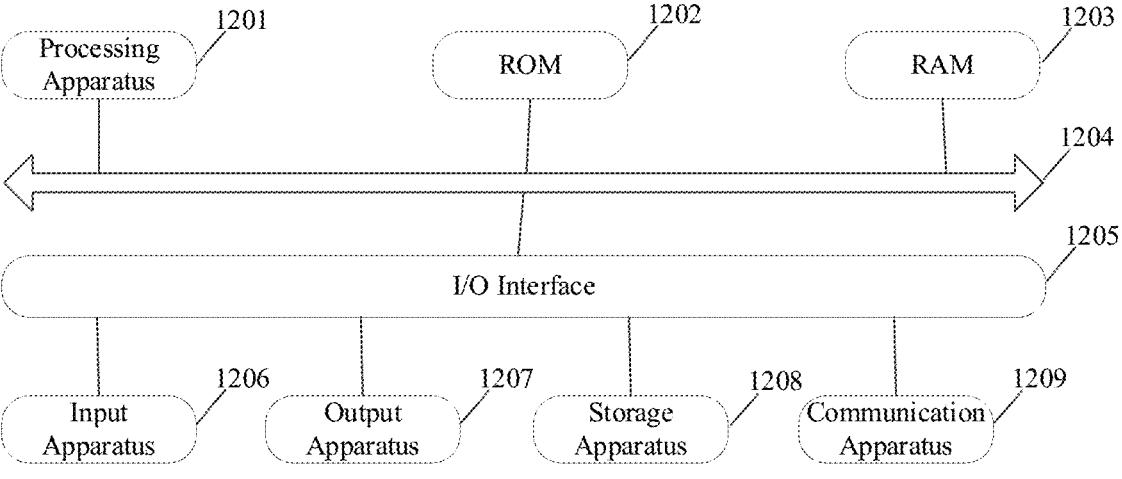
FIG. 12 is a schematic structural diagram of an electronic device provided by the present disclosure.

FIG. 12 is a schematic structural diagram of an electronic device provided by the present disclosure.

Referring to FIG. 12, FIG. 12 illustrates a schematic structural diagram of an electronic device 1200 suitable for implementing some embodiments of the present disclosure. The electronic devices in some embodiments of the present disclosure may include but are not limited to mobile terminals such as a mobile phone, a notebook computer, a digital broadcasting receiver, a personal digital assistant (PDA), a portable Android device (PAD), a portable media player (PMP), a vehicle-mounted terminal (e.g., a vehicle-mounted navigation terminal), a wearable electronic device or the like, and fixed terminals such as a digital TV, a desktop computer, or the like. The electronic device illustrated in FIG. 12 is merely an example, and should not pose any limitation to the functions and the range of use of the embodiments of the present disclosure.

As illustrated in FIG. 12, the electronic device 1200 may include a processing apparatus 1201 (e.g., a central processing unit, a graphics processing unit, etc.), which can perform various suitable actions and processing according to a program stored in a read-only memory (ROM) 1202 or a program loaded from a storage apparatus 1208 into a random-access memory (RAM) 1203. The RAM 1203 further stores various programs and data required for operations of the electronic device 1200. The processing apparatus 1201, the ROM 1202, and the RAM 1203 are interconnected by means of a bus 1204. An input/output (I/O) interface 1205 is also connected to the bus 1204.

Usually, the following apparatus may be connected to the I/O interface 1205: an input apparatus 1206 including, for example, a touch screen, a touch pad, a keyboard, a mouse, a camera, a microphone, an accelerometer, a gyroscope, or the like; an output apparatus 1207 including, for example, a liquid crystal display (LCD), a loudspeaker, a vibrator, or the like; a storage apparatus 1208 including, for example, a magnetic tape, a hard disk, or the like; and a communication apparatus 509. The communication apparatus 1209 may allow the electronic device 500 to be in wireless or wired communication with other devices to exchange data. While FIG. 12 illustrates the electronic device 1200 having various apparatuses, it should be understood that not all of the illustrated apparatuses are necessarily implemented or included. More or fewer apparatuses may be implemented or included alternatively.

Particularly, according to some embodiments of the present disclosure, the processes described above with reference to the flowcharts may be implemented as a computer software program. For example, some embodiments of the present disclosure include a computer program product, which includes a computer program carried by a non-transitory computer-readable medium. The computer program includes program codes for performing the methods shown in the flowcharts. In such embodiments, the computer program may be downloaded online through the communication apparatus 1209 and installed, or may be installed from the storage apparatus 1208, or may be installed from the ROM 1202. When the computer program is executed by the processing apparatus 1201, the above-mentioned functions defined in the methods of some embodiments of the present disclosure are performed.

It should be noted that the above-mentioned computer-readable medium in the present disclosure may be a computer-readable signal medium or a computer-readable storage medium or any combination thereof. For example, the computer-readable storage medium may be, but not limited to, an electric, magnetic, optical, electromagnetic, infrared, or semiconductor system, apparatus or device, or any combination thereof. More specific examples of the computer-readable storage medium may include but not be limited to: an electrical connection with one or more wires, a portable computer disk, a hard disk, a random-access memory (RAM), a read-only memory (ROM), an erasable programmable read-only memory (EPROM or flash memory), an optical fiber, a compact disk read-only memory (CD-ROM), an optical storage device, a magnetic storage device, or any appropriate combination of them. In the present disclosure, the computer-readable storage medium may be any tangible medium containing or storing a program that can be used by or in combination with an instruction execution system, apparatus or device. In the present disclosure, the computer-readable signal medium may include a data signal that propagates in a baseband or as a part of a carrier and carries computer-readable program codes. The data signal propagating in such a manner may take a plurality of forms, including but not limited to an electromagnetic signal, an optical signal, or any appropriate combination thereof. The computer-readable signal medium may also be any other computer-readable medium than the computer-readable storage medium. The computer-readable signal medium may send, propagate or transmit a program used by or in combination with an instruction execution system, apparatus or device. The program code contained on the computer-readable medium may be transmitted by using any suitable medium, including but not limited to an electric wire, a fiber-optic cable, radio frequency (RF) and the like, or any appropriate combination of them.

In some implementation modes, the client and the server may communicate with any network protocol currently known or to be researched and developed in the future such as hypertext transfer protocol (HTTP), and may communicate (via a communication network) and interconnect with digital data in any form or medium. Examples of communication networks include a local area network (LAN), a wide area network (WAN), the Internet, and an end-to-end network (e.g., an ad hoc end-to-end network), as well as any network currently known or to be researched and developed in the future.

The above-mentioned computer-readable medium may be included in the above-mentioned electronic device, or may also exist alone without being assembled into the electronic device.

The above-mentioned computer-readable medium carries one or more programs, and when the one or more programs are executed by the electronic device, the electronic device is caused to: acquire a first feature map and a second feature map of a current layer, generate a plurality of original makeup feature regions corresponding to a plurality of face parts according to the first feature map, acquire a first feature map and a second feature map of a current layer, generate a plurality of original makeup feature regions corresponding to a plurality of face parts according to the first feature map, further perform makeup migration calculations on each of the plurality of original makeup feature regions and a corresponding reference makeup feature region to acquire a plurality of candidate makeup feature regions, stitch the plurality of candidate makeup feature regions to generate a target feature map, and judge whether the target feature map satisfies a preset decoding condition, in a case where the preset decoding condition is satisfied, decoding the target feature map to acquire the target face image. Thus, a refined makeup migration between images, and the makeup migration is performed based on each of the face parts, which improve robustness of the makeup migration.

The computer program codes for performing the operations of the present disclosure may be written in one or more programming languages or a combination thereof. The above-mentioned programming languages include but are not limited to object-oriented programming languages such as Java, Smalltalk, C++, and also include conventional procedural programming languages such as the "C" programming language or similar programming languages. The program code may be executed entirely on the user's computer, partly on the user's computer, as a stand-alone software package, partly on the user's computer and partly on a remote computer, or entirely on the remote computer or server. In the scenario related to the remote computer, the remote computer may be connected to the user's computer through any type of network, including a local area network (LAN) or a wide area network (WAN), or the connection may be made to an external computer (for example, through the Internet using an Internet service provider).

The flowcharts and block diagrams in the accompanying drawings illustrate the architecture, functionality, and operation of possible implementations of systems, methods, and computer program products according to various embodiments of the present disclosure. In this regard, each block in the flowcharts or block diagrams may represent a module, a program segment, or a portion of codes, including one or more executable instructions for implementing specified logical functions. It should also be noted that, in some alternative implementations, the functions noted in the blocks may also occur out of the order noted in the accompanying drawings. For example, two blocks shown in succession may, in fact, can be executed substantially concurrently, or the two blocks may sometimes be executed in a reverse order, depending upon the functionality involved. It should also be noted that, each block of the block diagrams and/or flowcharts, and combinations of blocks in the block diagrams and/or flowcharts, may be implemented by a dedicated hardware-based system that performs the specified functions or operations, or may also be implemented by a combination of dedicated hardware and computer instructions.

The modules or units involved in the embodiments of the present disclosure may be implemented in software or hardware. Among them, the name of the module or unit does not constitute a limitation of the unit itself under certain circumstances.

The functions described herein above may be performed, at least partially, by one or more hardware logic components. For example, without limitation, available exemplary types of hardware logic components include: a field programmable gate array (FPGA), an application specific integrated circuit (ASIC), an application specific standard product (ASSP), a system on chip (SOC), a complex programmable logical device (CPLD), etc.

In the context of the present disclosure, the machine-readable medium may be a tangible medium that may include or store a program for use by or in combination with an instruction execution system, apparatus or device. The machine-readable medium may be a machine-readable signal medium or a machine-readable storage medium. The machine-readable medium includes, but is not limited to, an electrical, magnetic, optical, electromagnetic, infrared, or semi-conductive system, apparatus or device, or any suitable combination of the foregoing. More specific examples of machine-readable storage medium include electrical connection with one or more wires, portable computer disk, hard disk, random-access memory (RAM), read-only memory (ROM), erasable programmable read-only memory (EPROM or flash memory), optical fiber, portable compact disk read-only memory (CD-ROM), optical storage device, magnetic storage device, or any suitable combination of the foregoing.

According to one more embodiments of the disclosure, the disclosure provides a face image processing method, including: acquiring a first feature map and a second feature map of a current layer, and generating a plurality of original makeup feature regions corresponding to a plurality of face parts according to the first feature map;

generating a plurality of reference makeup feature regions corresponding to the plurality of face parts according to the second feature map;

performing makeup migration calculation on each of the original makeup feature regions and a corresponding reference makeup feature region to acquire a plurality of candidate makeup feature regions;

stitching the plurality of candidate makeup feature regions to generate a target feature map, and judging whether the target feature map satisfies a preset decoding condition;

in a case where the preset decoding condition is satisfied, the target feature map is decoded to acquire a target face image.

According to one or more embodiments of the disclosure, in the face image processing method provided by the disclosure, before acquiring the first feature map and the second feature map of the current layer, the method includes:

in response to a makeup migration request, acquiring an original image and a reference image corresponding to the makeup migration request, generating an instruction for performing makeup migration calculation for a plurality of layers on the original image and the reference image.

According to one or more embodiments of the disclosure, in the face image processing method provided by the disclosure, in a case where the current layer is an initial layer in the makeup migration calculation for the plurality of layers, the acquiring the first feature map and the second feature map of the current layer includes:

extracting image features from the original image to acquire the first feature map, extracting image features from the reference image to acquire the second feature map.

According to one or more embodiments of the disclosure, in the face image processing method provided by the disclosure, after judging whether the target feature map satisfies the preset decoding condition, the method further includes:

in a case where the preset decoding condition is not satisfied, updating the first feature map of the current layer according to the target feature map, as the first feature map to be processed in the next layer, stitching the plurality of reference makeup feature regions of the current layer, and updating the second feature map according to a stitched makeup feature map, as the second feature map to be processed in the next layer.

According to one or more embodiments of the disclosure, in the face image processing method provided by the disclosure, the performing makeup migration calculations on each of the plurality of original makeup feature regions and a corresponding reference makeup feature region to acquire the plurality of candidate makeup feature regions includes:

calculating each of the reference makeup feature regions, according to a first preset algorithm, to acquire a first variance feature matrix and a first mean feature matrix, calculating each of the original makeup feature regions, according to the first preset algorithm, to acquire a second variance feature matrix and a second mean feature matrix, calculating the second variance feature matrix, the second mean feature matrix and each of the original makeup feature regions, according to a second preset algorithm, to acquire normalized original makeup feature regions, and calculating the first variance feature matrix, the first mean feature matrix and corresponding normalized original makeup feature regions, according to a third preset algorithm, to acquire the plurality of candidate makeup feature regions.

According to one or more embodiments of the disclosure, in the face image processing method provided by the disclosure, the calculating each of the reference makeup feature regions, according to the first preset algorithm, to acquire the first variance feature matrix and the first mean feature matrix includes:

gridding each of the reference makeup feature regions, according to a plurality of different preset window sizes respectively, and generating initial variance feature maps and initial mean feature maps for each of the preset window sizes, according to gridded reference makeup feature regions, scaling all of the initial mean feature maps and the initial variance feature maps respectively, according to sizes of corresponding original makeup feature regions, to acquire a plurality of target mean feature maps and a plurality of target variance feature maps, calculating the plurality of target mean feature maps and the plurality of target variance feature maps, respectively, according to the corresponding original makeup feature regions, to generate the first mean feature matrix and the first variance feature matrix.

According to one or more embodiments of the disclosure, in the face image processing method provided by the disclosure, the gridding each of the plurality of the reference makeup feature regions respectively, according to the plurality of different preset window sizes, and generating initial variance feature maps and initial mean feature maps for each of the preset window sizes, according to gridded reference makeup feature regions includes:

gridding each of the reference makeup feature regions, according to the plurality of different preset window sizes, to generate a grid feature map corresponding to each of the preset window sizes, calculating feature mean values of all of feature values in each of grids in the grid feature map, and generating an initial mean feature map for each of the preset window sizes according to all of the feature mean values of all of the grids, calculating feature variance values of all of feature values in each of the grids in the grid feature map, and generating initial variance feature maps for each of the preset window sizes according to all of feature variance values of all of the grids.

According to one or more embodiments of the disclosure, in the face image processing method provided by the disclosure, the calculating the plurality of target mean feature maps and the plurality of target variance feature maps, respectively, according to the corresponding original makeup feature regions, to generate the first mean feature matrix and the first variance feature matrix includes:

stitching each of the reference makeup feature regions and the corresponding original makeup feature regions, and calculating stitched makeup feature region to generate a plurality of weight features corresponding to each of the target mean feature maps and each of the target variance feature maps, calculating all of the target mean feature maps and corresponding weight features, according to a fourth preset algorithm, to acquire the first mean feature matrix, calculate all of the target variance feature maps and corresponding weight features, according to the fourth preset algorithm, to acquire the first variance feature matrix.

According to one or more embodiments of the disclosure, in the face image processing method provided by the disclosure, the calculating all of the target mean feature maps and corresponding weight features, according to the fourth preset algorithm, to acquire the first mean feature matrix includes:

acquiring a plurality of first reference values according to the target mean feature maps and corresponding weight features, acquiring the first mean feature matrix according to the plurality of first reference values According to one or more embodiments of the disclosure, in the face image processing method provided by the disclosure, the acquiring the plurality of first reference values according to the target mean feature maps and corresponding weight features includes:

calculating a product value of each of the target mean feature maps and corresponding weight features, the acquiring the first mean feature matrix according to the plurality of first reference values includes:

calculating a sum of plurality of product values to acquire the first mean feature matrix.

According to one or more embodiments of the disclosure, in the face image processing method provided by the disclosure, the calculating the second variance feature matrix, the second mean feature matrix and each of the original makeup feature regions, according to the second preset algorithm, to acquire normalized original makeup feature regions includes: acquiring a second reference value according to the second variance feature matrix and each of the original makeup feature regions, acquiring the normalized original makeup feature regions according to the second reference value and the second mean feature matrix.

According to one or more embodiments of the disclosure, in the face image processing method provided by the disclosure, the acquiring the second reference value according to the second variance feature matrix and each of the original makeup feature regions includes:

calculating feature differences between each of the original makeup feature regions and the second variance feature matrix to acquire difference makeup feature regions.

According to one or more embodiments of the disclosure, in the face image processing method provided by the disclosure, the acquiring the second reference value according to the second variance feature matrix and each of the original makeup feature regions includes:

calculating feature ratios of the difference makeup feature regions and the second mean feature matrix to acquire the normalized original makeup feature regions.

According to one or more embodiments of the disclosure, in the face image processing method provided by the disclosure, the calculating the first variance feature matrix, the first mean feature matrix and corresponding normalized original makeup feature regions, according to the third preset algorithm, to acquire the plurality of candidate makeup feature regions includes:

acquiring a third reference value according to the first variance feature matrix and the normalized original makeup feature regions;

acquiring the candidate makeup feature regions according to the third reference value and features of the first mean feature matrix.

According to one or more embodiments of the disclosure, in the face image processing method provided by the disclosure, the acquiring a third reference value according to the first variance feature matrix and the normalized original makeup feature regions includes: calculating feature products of the first variance feature matrix and the normalized original makeup feature regions to acquire product makeup feature regions.

According to one or more embodiments of the disclosure, in the face image processing method provided by the disclosure, the acquiring the plurality of candidate makeup feature regions according to the third reference value and features of the first mean feature matrix includes: calculating a sum of the makeup feature regions and the first mean feature matrix to acquire the candidate makeup feature regions.

According to one or more embodiments of the disclosure, in the face image processing method provided by the disclosure, the judging whether the target feature map satisfies a preset decoding condition includes:

judging whether an order of the current layer is a preset order, wherein in a case where the order of the current layer is the preset order, the target feature map satisfying the preset decoding condition is determined.

According to one or more embodiments of the disclosure, the disclosure provides a face image processing apparatus, including:

a first generation module, configured to acquire a first feature map and a second feature map of a current layer, and generate a plurality of original makeup feature regions corresponding to a plurality of face parts according to the first feature map, a second generation module, configured to generate a plurality of reference makeup feature regions corresponding to the plurality of face parts according to the second feature map, an acquisition module, configured to perform makeup migration calculations on each of the original makeup feature regions and a corresponding reference makeup feature region to acquire a plurality of candidate makeup feature regions, a stitching module, configured to stitch the plurality of candidate makeup feature regions to generate a target feature map, a judgment module, configured to judge whether the target feature map satisfies a preset decoding condition, and a decoding module, configured to decode the target feature map to acquire a target face image, in a case where the preset decoding condition is satisfied.

According to one or more embodiments of the disclosure, in the face image processing apparatus provided by the disclosure, the apparatus further includes:

an image acquisition module, configured to, in response to a makeup migration request, acquire an original image and a reference image corresponding to the makeup migration request, an instruction generation module, configured to generate an instruction for performing makeup migration calculation for a plurality of layers on the original image and the reference image.

According to one or more embodiments of the disclosure, in the face image processing apparatus provided by the disclosure, the apparatus further includes, in a case where the current layer is an initial layer in the makeup migration calculation for the plurality of layers, the first generation module is specifically configured to:

extract image features from the original image to acquire the first feature map, and extract image features from the reference image to acquire the second feature map.

According to one or more embodiments of the disclosure, the apparatus further includes an updating module, configured to:

in a case where the preset decoding condition is not satisfied, update the first feature map of the current layer according to the target feature map, as the first feature map to be processed in the next layer;

stitch the plurality of reference makeup feature regions of the current layer, and update the second feature map according to a stitched makeup feature map, as the second feature map to be processed in the next layer.

According to one or more embodiments of the disclosure, the acquisition module is specifically configured to:

calculate each of the reference makeup feature regions, according to a first preset algorithm, to acquire a first variance feature matrix and a first mean feature matrix, calculate each of the original makeup feature regions, according to the first preset algorithm, to acquire a second variance feature matrix and a second mean feature matrix, calculate the second variance feature matrix, the second mean feature matrix and each of the original makeup feature regions, according to a second preset algorithm, to acquire normalized original makeup feature regions, calculate the first variance feature matrix, the first mean feature matrix and corresponding normalized original makeup feature regions, according to a third preset algorithm, to acquire the plurality of candidate makeup feature regions.

According to one or more embodiments of the disclosure, the acquisition module is specifically configured to:

grid each of the reference makeup feature regions, according to a plurality of different preset window sizes respectively, and generate initial variance feature maps and initial mean feature maps for each of the preset window sizes, according to gridded reference makeup feature regions, scale all of the initial mean feature maps and the initial variance feature maps respectively, according to sizes of corresponding original makeup feature regions, to acquire a plurality of target mean feature maps and a plurality of target variance feature maps, calculate the plurality of target mean feature maps and the plurality of target variance feature maps, respectively, according to the corresponding original makeup feature regions, to generate the first mean feature matrix and the first variance feature matrix.

According to one or more embodiments of the disclosure, in the face image processing apparatus provided by the disclosure, the acquisition module is specifically configured to:

grid each of the reference makeup feature regions, according to the plurality of different preset window sizes, to generate a grid feature map corresponding to each of the preset window sizes, calculate feature mean values of all of feature values in each of grids in the grid feature map, and generate an initial mean feature map for each of the preset window sizes according to all of the feature mean values of all of the grids, calculate feature variance values of all of feature values in each of the grids in the grid feature map, and generate initial variance feature maps for each of the preset window sizes according to all of feature variance values of all of the grids, scale all of the initial mean feature maps and the initial variance feature maps according to the size of the corresponding original makeup feature regions respectively, to acquire a plurality of target mean feature maps and a plurality of target variance feature maps.

According to one or more embodiments of the disclosure, in the face image processing apparatus provided by the disclosure, the acquisition module is specifically configured to:

stitch each of the reference makeup feature regions and the corresponding original makeup feature regions, and calculate stitched makeup feature region to generate a plurality of weight features corresponding to each of the target mean feature maps and each of the target variance feature maps, calculate all of the target mean feature maps and corresponding weight features, according to a fourth preset algorithm, to acquire the first mean feature matrix, calculate all of the target variance feature maps and corresponding weight features, according to the fourth preset algorithm, to acquire the first variance feature matrix.

According to one or more embodiments of the disclosure, in the face image processing apparatus provided by the disclosure, the acquisition module is further configured to:

acquire a plurality of first reference values according to the target mean feature maps and corresponding weight features, and acquire the first mean feature matrix according to the plurality of first reference values.

According to one or more embodiments of the disclosure, in the face image processing apparatus provided by the disclosure, the acquisition module is specifically configured to calculate a product value of each of the target mean feature maps and corresponding weight features; calculate a sum of plurality of product values to acquire the first mean feature matrix.

According to one or more embodiments of the disclosure, the acquisition module is specifically configured to:

acquire a second reference value according to the second variance feature matrix and each of the original makeup feature regions; and acquire the normalized original makeup feature regions according to the second reference value and the second mean feature matrix.

According to one or more embodiments of the disclosure, in the face image processing apparatus provided by the disclosure, the acquisition module is specifically configured to:

calculate feature differences between each of the original makeup feature regions and the second variance feature matrix to acquire difference makeup feature regions.

According to one or more embodiments of the disclosure, in the face image processing apparatus provided by the disclosure, the acquisition module is specifically configured to:

calculate feature ratios of the difference makeup feature regions and the second mean feature matrix to acquire the normalized original makeup feature regions.

According to one or more embodiments of the disclosure, in the face image processing apparatus provided by the disclosure, the acquisition module is specifically configured to:

acquire a third reference value according to the first variance feature matrix and the normalized original makeup feature regions;

acquire the candidate makeup feature regions according to the third reference value and features of the first mean feature matrix.

According to one or more embodiments of the disclosure, in the face image processing apparatus provided by the disclosure, the acquisition module is specifically configured to:

calculate feature products of the first variance feature matrix and the normalized original makeup feature regions to acquire product makeup feature regions.

According to one or more embodiments of the disclosure, in the face image processing apparatus provided by the disclosure, the acquisition module is specifically configured to:

calculate a sum of the makeup feature regions and the first mean feature matrix to acquire the candidate makeup feature regions.

According to one or more embodiments of the disclosure, in the face image processing apparatus provided by the disclosure, the judgement module is specifically configured to:

judge whether an order of the current layer is a preset order, in a case where the order of the current layer is the preset order, the target feature map satisfying the preset decoding condition is determined.

According to one or more embodiments of the disclosure, the disclosure provides an electronic device, including:

a processor, a memory, for storing instructions executable by the processor.

The processor is configured to read the executable instructions from the memory, and execute the executable instructions to implement any one of the face image processing methods provided by the disclosure.

According to one or more embodiments of the disclosure, the disclosure provides a computer readable storage medium. The computer storage medium stores a computer program. The computer program is used to execute any one of the face image processing methods provided by the disclosure.

The foregoing are merely descriptions of the preferred embodiments of the present disclosure and the explanations of the technical principles involved. It will be appreciated by those skilled in the art that the scope of the disclosure involved herein is not limited to the technical solutions formed by a specific combination of the technical features described above, and shall cover other technical solutions formed by any combination of the technical features described above or equivalent features thereof without departing from the concept of the present disclosure. For example, the technical features described above may be mutually replaced with the technical features having similar functions disclosed herein (but not limited thereto) to form new technical solutions.

In addition, while operations have been described in a particular order, it shall not be construed as requiring that such operations are performed in the stated specific order or sequence. Under certain circumstances, multitasking and parallel processing may be advantageous. Similarly, while some specific implementation details are included in the above discussions, these shall not be construed as limitations to the present disclosure. Some features described in the context of a separate embodiment may also be combined in a single embodiment. Rather, various features described in the context of a single embodiment may also be implemented separately or in any appropriate sub-combination in a plurality of embodiments.

Although the present subject matter has been described in a language specific to structural features and/or logical method acts, it will be appreciated that the subject matter defined in the appended claims is not necessarily limited to the particular features and acts described above. Rather, the particular features and acts described above are merely exemplary forms for implementing the claims.

The invention claimed is:

1. A face image processing method, comprising following steps:

acquiring a first feature map and a second feature map of a current layer, and generating a plurality of original makeup feature regions corresponding to a plurality of face parts according to the first feature map, generating a plurality of reference makeup feature regions corresponding to the plurality of face parts according to the second feature map, performing makeup migration calculation on each of the original makeup feature regions and a corresponding reference makeup feature region to acquire a plurality of candidate makeup feature regions, stitching the plurality of candidate makeup feature regions to generate a target feature map, and judging whether the target feature map satisfies a preset decoding condition, wherein, in a case where the preset decoding condition is satisfied, the target feature map is decoded to acquire a target face image.

2. The method according to claim 1, wherein, before acquiring the first feature map and the second feature map of the current layer, the method comprises:

in response to a makeup migration request, acquiring an original image and a reference image corresponding to the makeup migration request, generating an instruction for performing makeup migration calculation for a plurality of layers on the original image and the reference image.

3. The method according to claim 2, wherein in a case where the current layer is an initial layer in the makeup migration calculation for the plurality of layers, the acquiring the first feature map and the second feature map of the current layer comprises:

extracting image features from the original image to acquire the first feature map, and extracting image features from the reference image to acquire the second feature map.

4. The method according to claim 1, wherein after judging whether the target feature map satisfies the preset decoding condition, the method further comprises:

in a case where the preset decoding condition is not satisfied, updating the first feature map of the current layer according to the target feature map, as the first feature map to be processed in the next layer, and stitching the plurality of reference makeup feature regions of the current layer, and updating the second feature map according to a stitched makeup feature map, as the second feature map to be processed in the next layer.

5. The method according to claim 1, wherein the performing makeup migration calculations on each of the plurality of original makeup feature regions and a corresponding reference makeup feature region to acquire the plurality of candidate makeup feature regions comprises:

calculating each of the reference makeup feature regions, according to a first preset algorithm, to acquire a first variance feature matrix and a first mean feature matrix, calculating each of the original makeup feature regions, according to the first preset algorithm, to acquire a second variance feature matrix and a second mean feature matrix, calculating the second variance feature matrix, the second mean feature matrix and each of the original makeup feature regions, according to a second preset algorithm, to acquire normalized original makeup feature regions, and calculating the first variance feature matrix, the first mean feature matrix and corresponding normalized original makeup feature regions, according to a third preset algorithm, to acquire the plurality of candidate makeup feature regions.

6. The method according to claim 5, wherein the calculating each of the reference makeup feature regions, according to the first preset algorithm, to acquire the first variance feature matrix and the first mean feature matrix comprises:

gridding each of the reference makeup feature regions, according to a plurality of different preset window sizes respectively, and generating initial variance feature maps and initial mean feature maps for each of the preset window sizes, according to gridded reference makeup feature regions, scaling all of the initial mean feature maps and the initial variance feature maps respectively, according to sizes of corresponding original makeup feature regions, to acquire a plurality of target mean feature maps and a plurality of target variance feature maps, and calculating the plurality of target mean feature maps and the plurality of target variance feature maps, respectively, according to the corresponding original makeup feature regions, to generate the first mean feature matrix and the first variance feature matrix.

7. The method according to claim 6, wherein the gridding each of the plurality of the reference makeup feature regions respectively, according to the plurality of different preset window sizes, and generating initial variance feature maps and initial mean feature maps for each of the preset window sizes, according to gridded reference makeup feature regions comprises:

gridding each of the reference makeup feature regions, according to the plurality of different preset window sizes, to generate a grid feature map corresponding to each of the preset window sizes, calculating feature mean values of all of feature values in each of grids in the grid feature map, and generating an initial mean feature map for each of the preset window sizes according to all of the feature mean values of all of the grids, and calculating feature variance values of all of feature values in each of the grids in the grid feature map, and generating initial variance feature maps for each of the preset window sizes according to all of feature variance values of all of the grids.

8. The method according to claim 6, wherein the calculating the plurality of target mean feature maps and the plurality of target variance feature maps, respectively, according to the corresponding original makeup feature regions, to generate the first mean feature matrix and the first variance feature matrix comprises:

stitching each of the reference makeup feature regions and the corresponding original makeup feature regions, and calculating stitched makeup feature region to generate a plurality of weight features corresponding to each of the target mean feature maps and each of the target variance feature maps, calculating all of the target mean feature maps and corresponding weight features, according to a fourth preset algorithm, to acquire the first mean feature matrix, and calculate all of the target variance feature maps and corresponding weight features, according to the fourth preset algorithm, to acquire the first variance feature matrix.

9. The method according to claim 8, wherein the calculating all of the target mean feature maps and corresponding weight features, according to the fourth preset algorithm, to acquire the first mean feature matrix comprises:

acquiring a plurality of first reference values according to the target mean feature maps and corresponding weight features, and acquiring the first mean feature matrix according to the plurality of first reference values.

10. The method according to claim 9, wherein the acquiring the plurality of first reference values according to the target mean feature maps and corresponding weight features comprises:

calculating a product value of each of the target mean feature maps and corresponding weight features, the acquiring the first mean feature matrix according to the plurality of first reference values comprises:

calculating a sum of plurality of product values to acquire the first mean feature matrix.

11. The method according to claim 5, wherein the calculating the second variance feature matrix, the second mean feature matrix and each of the original makeup feature regions, according to the second preset algorithm, to acquire normalized original makeup feature regions comprises:

acquiring a second reference value according to the second variance feature matrix and each of the original makeup feature regions; and acquiring the normalized original makeup feature regions according to the second reference value and the second mean feature matrix.

12. The method according to claim 11, wherein the acquiring the second reference value according to the second variance feature matrix and each of the original makeup feature regions comprises:

calculating feature differences between each of the original makeup feature regions and the second variance feature matrix to acquire difference makeup feature regions.

13. The method according to claim 12, wherein the acquiring the second reference value according to the second variance feature matrix and each of the original makeup feature regions comprises:

calculating feature ratios of the difference makeup feature regions and the second mean feature matrix to acquire the normalized original makeup feature regions.

14. The method according to claim 5, wherein the calculating the first variance feature matrix, the first mean feature matrix and corresponding normalized original makeup feature regions, according to the third preset algorithm, to acquire the plurality of candidate makeup feature regions comprises:

acquiring a third reference value according to the first variance feature matrix and the normalized original makeup feature regions; and acquiring the candidate makeup feature regions according to the third reference value and features of the first mean feature matrix.

15. The method according to claim 14, wherein the acquiring a third reference value according to the first variance feature matrix and the normalized original makeup feature regions comprises:

calculating feature products of the first variance feature matrix and the normalized original makeup feature regions to acquire product makeup feature regions.

16. The method according to claim 15, wherein the acquiring the plurality of candidate makeup feature regions according to the third reference value and features of the first mean feature matrix comprises:

calculating a sum of the makeup feature regions and the first mean feature matrix to acquire the candidate makeup feature regions.

17. The method according to claim 1, wherein the judging whether the target feature map satisfies a preset decoding condition comprises:

judging whether an order of the current layer is a preset order, wherein in a case where the order of the current layer is the preset order, the target feature map satisfying the preset decoding condition is determined.

18. A non-transitory computer readable storage medium, wherein the storage medium stores a computer program, and the computer program is used to execute the face image processing method according to claim 1.

19. A face image processing apparatus, comprising:

a first generation module, configured to acquire a first feature map and a second feature map of a current layer, and generate a plurality of original makeup feature regions corresponding to a plurality of face parts according to the first feature map, a second generation module, configured to generate a plurality of reference makeup feature regions corresponding to the plurality of face parts according to the second feature map, an acquisition module, configured to perform makeup migration calculations on each of the original makeup feature regions and a corresponding reference makeup feature region to acquire a plurality of candidate makeup feature regions, a stitching module, configured to stitch the plurality of candidate makeup feature regions to generate a target feature map, a judgment module, configured to judge whether the target feature map satisfies a preset decoding condition, and a decoding module, configured to decode the target feature map to acquire a target face image, in a case where the preset decoding condition is satisfied.

20. An electronic device, comprising:

a processor, a memory, for storing instructions executable by the processor, wherein the processor is configured to read the executable instructions from the memory, and execute the executable instructions to implement a face image processing method, the method comprises: acquiring a first feature map and a second feature map of a current layer, and generating a plurality of original makeup feature regions corresponding to a plurality of face parts according to the first feature map, generating a plurality of reference makeup feature regions corresponding to the plurality of face parts according to the second feature map, performing makeup migration calculation on each of the original makeup feature regions and a corresponding reference makeup feature region to acquire a plurality of candidate makeup feature regions, stitching the plurality of candidate makeup feature regions to generate a target feature map, and judging whether the target feature map satisfies a preset decoding condition, wherein, in a case where the preset decoding condition is satisfied, the target feature map is decoded to acquire a target face image.

* * * * *